T. W. THOMAS.
SHOVEL OPERATING MACHINE.
APPLICATION FILED MAY 24, 1920.

1,386,911.  Patented Aug. 9, 1921.

Inventor
Thomas W. Thomas, by
Attorney

UNITED STATES PATENT OFFICE.

THOMAS W. THOMAS, OF BALTIMORE, MARYLAND.

SHOVEL-OPERATING MACHINE.

1,386,911.   Specification of Letters Patent.   Patented Aug. 9, 1921.

Application filed May 24, 1920. Serial No. 383,873.

*To all whom it may concern:*

Be it known that I, THOMAS W. THOMAS, a citizen of the United States, residing at Baltimore, in the county of Baltimore, and State of Maryland, have invented certain new and useful Improvements in Shovel-Operating Machines; and I do hereby declare the following to be a full, clear, and exact description of the invention, such as will enable others skilled in the art to which it appertains to make and use the same.

This invention relates to shovel operating machines and has for its object to provide an apparatus of this nature which will be simple in construction, comparatively inexpensive to manufacture, and more efficient in action than those heretofore proposed.

With these and other objects in view the invention consists in the novel details of construction and combinations of parts more fully hereinafter disclosed and particularly pointed out in the claims.

Referring to the accompanying drawings forming a part of this specification in which like numerals designate like parts in all the views:—

Figure 1:
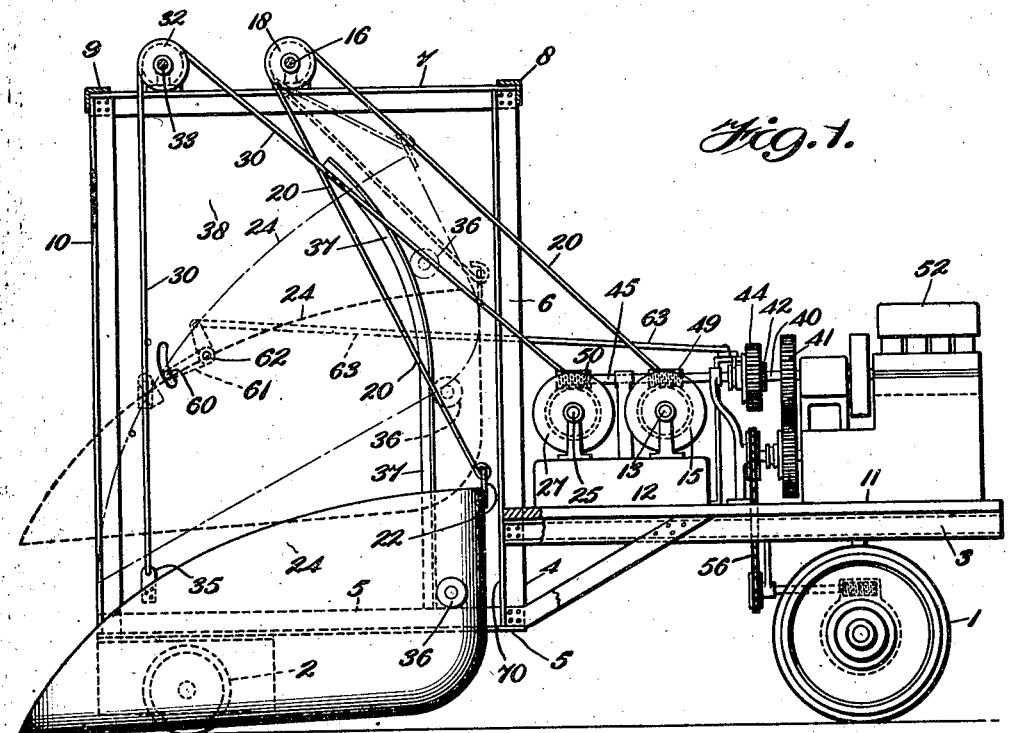
Figure 2:
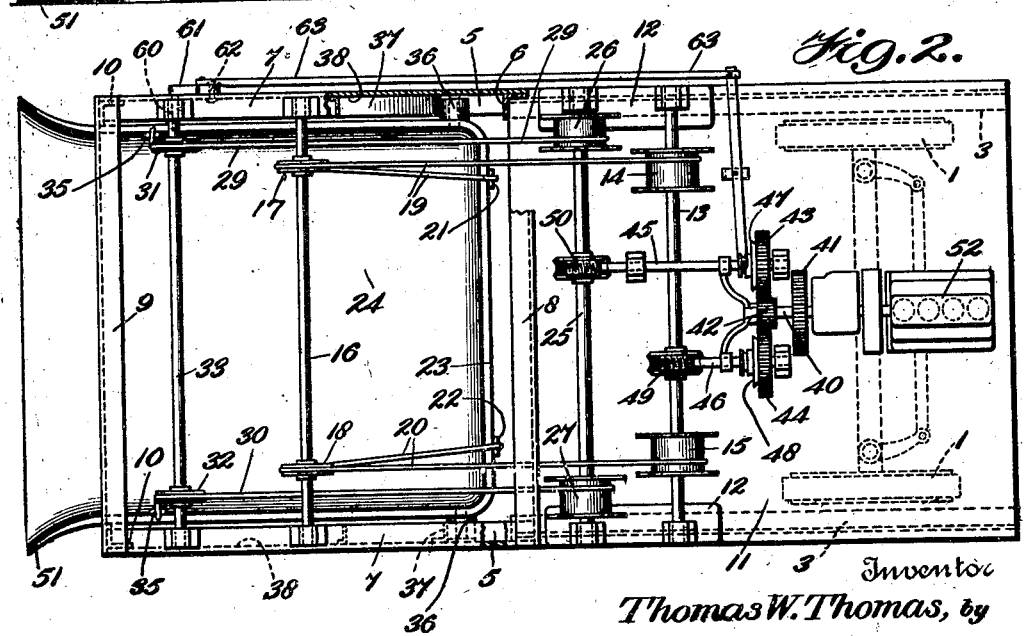

Figure 1 is an elevational view partly in section of an apparatus made in accordance with this invention; and Fig. 2 is a plan view partially broken away of the parts shown in Fig. 1.

1 indicates rear wheels, 2 front wheels, 3 the rear portion of the frame work of a truck platform mounted on said wheels, 4 uprights of said framework located between wheels 1 and 2, and 5 horizontal frame supports extending from the uprights 4 and beyond the front wheels. 6 represents upper extensions of the uprights 4 to which are attached the upper side bracing members 7, and 8 represents angle members securing the members 6 and 7 together.

The forward ends of the members 7 are secured by the angle members 9 which also are attached to the forward uprights 10 as illustrated. Supported on the truck frame work just described is the floor, or platform 11 carrying the raised members or supports 12 on which is mounted the shaft 13 provided with the drums 14 and 15, and mounted on the upper members 7 is the shaft 16 carrying the pulley members 17 and 18 over which respectively pass the ropes, or other resilient connections 19 and 20. One end of each of said connections 19 and 20 is secured to the drums 14 and 15 as indicated, and the other ends of said connections are secured as at the points 21 and 22 to the rear portions 23 of the shovel or scoop member 24. Also mounted on the supports 12 is the shaft 25 carrying the drums 26 and 27, to which are respectively attached the ropes or resilient members 29 and 30 which pass over the pulleys 31 and 32 mounted on the shaft 33 likewise supported on the upper members 7 as illustrated.

The forward ends of the said connections 29 and 30 are secured to the shovel or bucket 24 as at the points 35, or near its forward portion as shown. The shovel or scoop 24 is supported when in its lowest position by means of the rollers 36 resting upon the side frames or supports 5 which are made of great strength and suitably spaced apart to accommodate said shovel 24. In fact, the open ended space between said members 5 really constitutes a cut away portion of the truck floor to accommodate said shovel 24 and to cause the center of gravity of the load to lie between the wheels 1 and 2. 37 represents guide members carried by the side plates 38 against which said rollers take when the scoop or shovel 24 is elevated. Power is transmitted through the shaft 40 from the engine 52 to the pinion 42 which is in mesh with the gears 43 and 44 turning the shafts 45 and 46 respectively. 47 and 48 represent clutches for engaging and disengaging the said gears 43 and 44 from their respective shafts 45 and 46. The shaft 46 turns the worm 49, shaft 13, and drums 14 and 15, while the shaft 45 turns the worm 50, shaft 25, and drums 26 and 27.

The operation of this device will be clear from the foregoing but may be briefly summarized as follows:—

Normally the shovel 24 occupies the position shown in Fig. 1 with its forward end or nose part 51 resting upon the floor or other support on which rests the material to be handled. The engine 52 is started, whereupon, when the clutches 47 and 48 are engaged, power is transmitted from the shaft 40 to the pinion 42, to the shafts 45 and 46, to the worms 50 and 49, and to the shafts 13 and 25. Power is also transmitted to the gear 41 through the mechanism 56 and its associated parts to the truck wheels 1, so that the truck is driven forward and the scoop 24 is filled with coal or other material to be handled.

When the scoop is being filled the clutches 47 and 48 are out of action so that the drums 14 and 15, 26 and 27 are inactive. When the shovel 24 is thus being filled the rollers 36 are driven back and rest upon the points 70 of the frames 4 so that the full power of the engine is utilized in the filling operation. After the scoop 24 is thus filled, however, the clutch 47 may be thrown into action, whereupon the drums 26 and 27 will be turned to raise the forward ends 51 of the scoop so that its contents will not be spilled. After this has been accomplished, the truck loaded with the material being handled may be driven to any desired distance, and since the center of gravity of the load is positioned between the front and back wheels, there will be no danger of spilling the contents of the scoop when rough places are encountered on the way. After the desired destination is reached the rear clutches 48 may be first thrown into action to raise the rear end 23 of the scoop past the straight portions of the guides 37 and then the front clutch 47 may be thrown into action so that the front and rear of the scoop will rise simultaneously.

The truck when it reaches its destination is so driven that the end 51 of the scoop overlies the point at which the material is to be dumped, and when the clutches 47 and 48 are manipulated in the manner disclosed, the scoop 24 will steadily rise as indicated in dotted lines in Fig. 1 whereupon its edge will strike the pin 60 of the bell crank lever 61 pivoted at 62 which will disengage the forward clutch 47 by means of the connection 63 thus stopping the ascent of the forward end of the shovel 24 while continuing the ascent of its rear end 23. This action causes the scoop to tilt into the position indicated by the upper dotted lines in Fig. 1 and its contents to be dumped. The truck is now backed off and may be returned for another load. 71 indicates the usual change gear box and of course the truck is provided with all the other usual equipment not shown, that is to be found on motor trucks of this character.

It is obvious that those skilled in the art may vary the details of the construction as well as the arrangement of parts without departing from the spirit of the invention and therefore, I do not wish to be limited to the above disclosure except as may be required by the claims.

What I claim is:—

1. In a shovel operating machine the combination of a truck frame provided with front and rear wheels, and with a pair of forwardly projecting members forming an open ended space between the front wheels; a shovel supported by said frame in said space with its center of gravity when loaded located between said front and rear wheels and with its open end pointing forward; power means carried by the frame for forcing said shovel into a pile of material to fill said shovel; power means for raising the front end of said shovel; and power means for raising the rear end of said shovel, substantially as described.

2. In a shovel operating machine the combination of a truck frame provided with front and rear wheels; and with a pair of forwardly projecting members forming an open ended space between the front wheels; a shovel supported by said frame in said space with its center of gravity, when loaded, located between said front and rear wheels; and with its open end pointing forward; power means carried by the frame for forcing said shovel into a pile of material to fill said shovel; power means comprising a clutch controlled shaft for raising the front end of said shovel; and power means comprising another clutch controlled shaft for raising the rear end of said shovel, substantially as described.

3. In a shovel operating machine the combination of a truck frame provided with front and rear wheels and with a pair of forwardly projecting members forming an open ended space between the front wheels; a shovel supported by said frame in said space with its center of gravity, when loaded, located between said front and rear wheels, and with its open end pointing forward; power means carried by the frame for forcing said shovel into a pile of material to fill said shovel; power means comprising a pair of drums, a worm gear and a clutch controlled shaft for driving said gear for raising the front end of said shovel; power means for raising the rear end of said shovel; and automatic means operated by said shovel for governing the power transmitted through said clutch controlled shaft, substantially as described.

4. In a shovel operating machine the combination of a shovel; a set of wheels; means for supporting said shovel with its center of gravity located between said wheels; power means for automatically loading said shovel; power means for raising the forward end of said shovel; power means for raising the rear end of said shovel; and power means for dumping said shovel when in its raised position, substantially as described.

5. In a shovel operating machine the combination of a shovel; a set of wheels; means for supporting said shovel with its center of gravity located between said wheels; power means for automatically loading said shovel; a frame work for taking the thrust of said shovel during the loading operation; means for raising the forward end of said shovel; power means for raising the rear end of said shovel; guide surfaces for controlling the movements of said rear end; and automatic power means for dumping said shovel when in its raised position, substantially as described.

6. In a shovel operating machine the combination of a frame provided with supporting wheels; a shovel member movably carried by said frame; means for forcing said shovel into a pile of material to load the same; power means for raising the forward end of said shovel; power means for raising the rear end of said shovel; and means for controlling said first named power means whereby said shovel may be tilted to discharge its contents, substantially as described.

7. In a shovel operating machine the combination of a frame provided with supporting wheels; a shovel member movably carried by said frame; means for forcing said shovel into a pile of material to load the same; power means for rasing the forward end of said shovel; power means for raising the rear end of said shovel; and automatic means actuated by said shovel for controlling said first named power means whereby said shovel may be tilted when in its raised position to discharge its contents, substantially as described.

In testimony whereof I affix my signature.

THOMAS W. THOMAS.